United States Patent
Bauer

(10) Patent No.: US 6,823,295 B2
(45) Date of Patent: Nov. 23, 2004

(54) OPTIMIZATION OF THE NETWORK STRUCTURE OF RADIO COMMUNICATION SYSTEM

(75) Inventor: Claus Bauer, München (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 09/817,965

(22) Filed: Mar. 27, 2001

(65) Prior Publication Data

US 2001/0051859 A1 Dec. 13, 2001

(30) Foreign Application Priority Data

Mar. 27, 2000 (DE) ......................................... 100 15 012

(51) Int. Cl.[7] .............................................. G06F 13/00
(52) U.S. Cl. .............................. 703/2; 703/14; 709/201; 455/433; 455/445
(58) Field of Search ............................... 703/2, 14, 17, 703/16, 18; 709/201, 223, 227; 455/433, 445, 446, 453

(56) References Cited

U.S. PATENT DOCUMENTS

| | | | | |
|---|---|---|---|---|
| 5,465,390 A | * | 11/1995 | Cohen | ........................ 455/33.4 |
| 5,561,841 A | * | 10/1996 | Markus | ....................... 455/33.1 |
| 5,764,740 A | * | 6/1998 | Holender | ...................... 379/112 |
| 6,085,335 A | * | 7/2000 | Djoko et al. | ................... 714/26 |
| 6,097,951 A | * | 8/2000 | Ernam et al. | ................ 455/433 |
| 6,370,572 B1 | * | 4/2002 | Lindskog et al. | ............ 709/223 |

* cited by examiner

Primary Examiner—Thai Phan
(74) Attorney, Agent, or Firm—Laurence A. Greenberg; Werner H. Stemer; Ralph E. Locher

(57) ABSTRACT

Geographically oriented units of a given first hierarchical level of a radio communication system are assigned to geographically oriented units of at least one higher second hierarchical level by: Setting up functions that specify, as a function of a number of subscribers of a radio communication system, a size of a load, that is selected from the group consisting of a radio load and a switching load, and that is caused by a geographically oriented unit of a first hierarchical level at a node of the radio communication system. Setting up a formula which, using the functions, permits a size of a processing load occurring at each node, in a case of a given assignment of geographically oriented units of the first hierarchical level to geographically oriented units of the second hierarchical level, to be calculated for a given number of the subscribers. Using the formula to select an assignment that permits a greatest possible growth in a number of subscribers of the radio communication system without a processing load at a geographically oriented unit of the second hierarchical level exceeding resources of the geographically oriented unit of the second hierarchical level.

6 Claims, 3 Drawing Sheets

OPTIMIZATION OF THE NETWORK STRUCTURE OF RADIO COMMUNICATION SYSTEM

BACKGROUND OF THE INVENTION

Field of the Invention

The present invention relates to the optimization of the network structure of a radio communication system. More precisely, it relates to a method for assigning geographically oriented units of a given first hierarchical level of a radio communication system to geographically oriented units of at least one higher second hierarchical level.

Radio communication systems such as the GSM system have a hierarchical structure. The lowest level of this structure is formed by transmitter/receiver stations which communicate by radio with terminals, which in GSM terminology are denoted as base stations, or with the cells served by them. A plurality of base stations or their cells are supplied by a base station controller BSC. The totality of the cells of the base stations supplied by a BSC is therefore also denoted as a BSC region. A plurality of BSCs are supplied in each case on a higher hierarchical level by a mobile switching center (MSC). The totality of the cells assigned to an MSC is therefore also denoted as the MSC region.

In order, within an MSC region, to find a subscriber to whom a connection is to be set up, a search signal is emitted on the broadcast channel and causes the subscriber terminal to respond. When the number of the subscribers in an MSC region is low, this search signal can be emitted in all cells of the MSC region. When the number of the subscribers is large, the capacity of the broadcast channel is not sufficient for this purpose, and it can be necessary to subdivide this MSC region into a plurality of interconnected location areas and to emit the search signal only in that location area in which it is known that the targeted subscriber is located. On the other hand, the subdivision of the MSC region into location areas will cause the MSC to keep a record as to which of the various location areas of an MSC region a subscriber is currently located in. The processing load which is placed on an MSC by the management of the mobile subscribers is therefore a function of the type of division of the MSC region into location areas. The division of the MSC region or its location areas into BSC regions also influences the processing load. Consequently, there is a need for methods which, starting from a given distribution of base stations, MSCs and BSCs in a geographic zone, in each case permit the specification of assignments of the base stations to BSCs, to location areas and/or to MSCs which minimize the processing load, or permit the largest possible number of subscribers to be served for a given processing performance of the mobile radio communication system.

This processing load occurs predominantly in the MSCs. The MSC in a mobile radio communication system has two main functions, call processing and mobility management.

Call processing is understood here as the processing of any type of voice or data communication. The load caused at the MSC by call processing is a function of the type of communication (data, fax, short message service, etc.) and of the position of the two communicating subscribers relative to the network topology. It is, for example, different for calls within the mobile radio communication system and for calls from an external network into the mobile radio communication system or from the mobile radio communication system into an external network. In the case of calls within a network, as well, the load at the MSC is different depending on whether the two subscribers of a call belong to the same BSC and/or MSC region or not.

Mobility management is understood to be all transactions in the system which are caused by the tracing and recording in that cell of the network in which an individual subscriber is located. A distinction is to be made here between handover and updating the location of a subscriber (location update).

Handover is understood as the change of a subscriber from one cell into another cell in simultaneous conjunction with maintaining a running connection by allocation of resources to the other cell. The load which is caused by a handover at the MSC depends substantially on the position of the two cells participating in the handover relative to the network topology. Three cases which load the MSC to a different extent in each case, are to be distinguished here:

a. both cells belong to the same BSC region, but not to the same base station;

b. they belong to the same MSC region, but not to the same BSC region, or c. they do not belong to the same MSC region.

In the case of the GSM network, a handover between cells which belong to the same base station need not be taken into account, since the MSC does not participate in the management of such a handover.

A location update takes part when a subscriber changes his cell in the stand-by mode. Two cases are to be distinguished here:

when the two cells belong to the same location area he need not be acknowledged by the MSC, nor does he cause a load there, and when said subscriber changes the location area (or the MSC region), this subscriber must be removed from one list in the MSC and entered into another (in the same or another MSC) depending on whether the two cells belong to two different location areas within an MSC region or to two different MSC regions.

The actual load which is caused at the MSC by these diverse management operations, and which can be measured, for example, in the form of required computing time or the number of processor commands executed, can vary for different models of the MSCs.

However, the optimization of network topologies is complicated not only by the different types of modes to be taken into account, but also by virtue of the fact that the individual cells, BSC regions, MSC regions etc., in general terms the various geographically oriented units of different hierarchical levels, differ in their properties such as, for example, number of subscribers, subscriber behavior etc.

All of this renders optimization of a network structure an extremely complex problem to solve which use has been made to date essentially of empirical rules or heuristic approaches.

SUMMARY OF THE INVENTION

It is accordingly an object of the invention to provide a method for assigning geographically oriented units of a given first hierarchical level of a radio communication system to geographically oriented units of at least one second, higher hierarchical level which overcomes the above-mentioned disadvantageous of the prior art apparatus and methods of this general type. In particular, it is an object of the invention to provide such a method that permits effective minimization of the processing outlay connected with the management of calls and subscriber mobility, in which the method is based on mathematical foundations, and requires a low computational outlay.

With the foregoing and other objects in view there is provided, in accordance with the invention, a method for assigning geographically oriented units of a first hierarchical level of a radio communication system to geographically oriented units of at least one second hierarchical level that is higher than the first hierarchical level.

A first step in the method is to set up functions which specify, as a function of the number of subscribers of the radio communication system, the size of a processing load which is caused by a geographically oriented unit of the first hierarchical level at a node of the radio communication system such as an MSC for example. A basis for setting up these functions can be taken from empirical measurements of the traffic volume and of the subscriber behavior in the individual cells of the radio communication system.

Starting from these functions, a formula is then set up which permits these functions to be used to calculate the processing load occurring at the relevant nodes for a given assignment of the units of the first hierarchical level to the units of the second hierarchical level.

Using this formula, which supplies the load as a function of the number of subscribers in the network, it is possible to select an assignment which permits the greatest possible growth in the number of subscribers above the current number of subscribers in the network, without the load to be processed by a node in the radio communication network exceeding the resources of this node.

Different methods can be used to select this assignment.

In accordance with an added feature of the invention, methods of linear optimization are preferably used to select the assignment. Such methods are described in various text books and implemented in a majority of commercially available computer programs.

In accordance with an additional feature of the invention, the method can be used on different hierarchical levels of the radio communication system. Thus, for example, it is possible to select cells as units of the first hierarchical level and BSC regions of the radio communication system as units of the second hierarchical level, in order in each case to optimize the structure of the system within the location area or MSC region. It is also possible for location areas and/or BSC regions to be taken as units of the second hierarchical level, in order to optimize the structure of the overall network.

In accordance with another feature of the invention, in order to keep the processing simple, the functions which specify the size of the load can be approximated as linear functions of the number of subscribers.

In accordance with a further feature of the invention, a substantial simplification of the method is provided. This can be achieved by starting from a given, typically actually existing assignment of the units of the first hierarchical level of the radio communication system to the units of the second hierarchical level, and when selecting the assignment which permits the largest possible rise in the number of subscribers, by taking account only of assignments which differ from the given assignment only in the case of such units of the first hierarchical level as are respectively situated in the given assignment at the boundaries between two units of the second hierarchical level. This mode of procedure is particularly expedient in radio communication systems having a large number of units of the first hierarchical level, since the number of the theoretically possible assignments of units of the first hierarchical level to the units of the second one increases super-exponentially with the number of these units, and the number of assignments possibly to be taken into account is reduced radically in this way.

Of course, the consequence of such a limitation can be the failure to find an even better distribution which would have required the redistribution not only of geographically oriented units of the first hierarchical level situated at a boundary, but also of a unit adjacent thereto and situated in the interior of a unit of the second hierarchical level. However, this is not a serious disadvantage since, after a single pass of the method, such a unit of the first hierarchical level comes to be situated at the boundary of the newly formed units of the second hierarchical level, and can therefore likewise be reordered by iterative application of the method.

Other features which are considered as characteristic for the invention are set forth in the appended claims.

Although the invention is illustrated and described herein as embodied in an optimization of the network structure of a radio communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
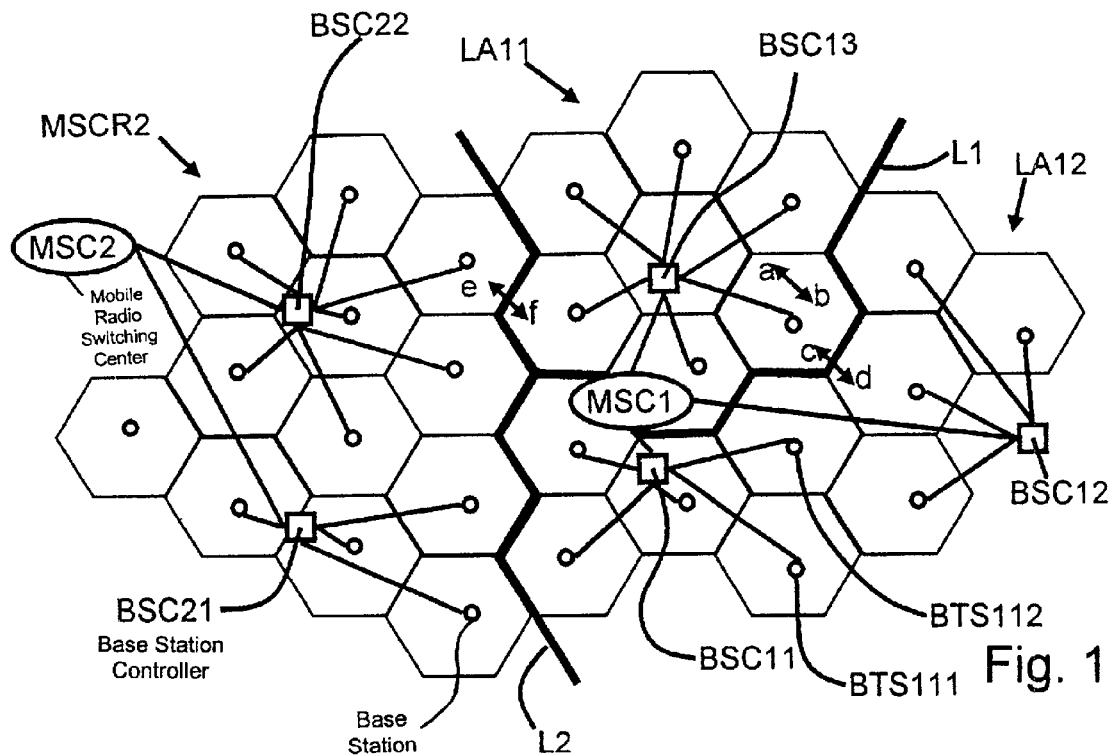
FIG. 1 shows an exemplary topology of a radio communication system to which the method according to the invention can be applied.

Referring now to the figures of the drawing in detail and first, particularly, to FIG. 1 thereof, there is shown an idealized illustration of the topology of a section of a radio communication system, here a GSM (Global Systems for Mobile Communications) system. Located in the section under consideration are two mobile radio switching centers MSCk, k=1,2, which are connected in each case to a plurality of base station controllers BSCkl, l=1,2, . . . , illustrated as squares. A plurality of base stations BTSkli, i=1,2, . . . , illustrated as circles, are connected to each BSC and each supply a cell of the network. The cells, idealized here as hexagons, form a complete coverage of the geographic zone under consideration.

The cells constitute the geographically oriented units with the lowest hierarchical level in the radio communication system. All cells connected to a BSC, for example BSC11, form a BSC region which constitutes the geographically oriented unit of the next higher hierarchical level. The BSC regions of BSC11 and BSC12 are combined to form a common location area LA12 which, in turn, forms a geographically oriented unit of a higher hierarchical level. The BSC13, likewise connected to the MSC1, belongs to another location area LA11, and this is illustrated in the figure by the bold boundary line L1.

The two location areas LA11, LA12 together form the MSC region MSCR1 of the MSC1, which is separated from the MSC region of the MSC2 by a boundary line L2.

The MSCR2 is not subdivided into location areas.

It is easy to see that a subscriber who moves within a cell from a point a to b and back does not cause a processing load in the mobility management of an MSC1 assigned to him. Another subscriber who moves from point c to d and over the boundary L1 does, however, cause such a load, because when leaving a location area he has to be removed from the list of the subscribers who can be searched for therein, and entered into an appropriate list of the other location area. Since both location areas belong to the MSC1, the load occurs completely in the latter. In the case of a subscriber movement between the points e and f on both sides of the boundary L2, the load is increased by virtue of the fact that the two MSCs between whose regions the subscriber movement takes place must communicate about the entry and removal of the subscriber from the respective lists, in order to ensure that it always remains possible to reach said subscriber.

The extent of the processing load depends on a multiplicity of factors, naturally for one thing on the number of the subscribers in a cell, but also on their mobility behavior and/or communication behavior. The nature and the geographic position of a cell also play a role. Thus, for example, cells located in inner city areas are generally substantially smaller than those located in more sparsely populated districts, and because of the receiving conditions which vary strongly because of buildings, their configuration frequently differs strongly from the idealized hexagon. Consequently, when a subscriber moves in an urban area a multiplicity of cell changes occur even over short distances; these changes have to be managed, whereas an equally long movement outside a town can possibly take place completely within one cell. It is therefore important that the nature of the cells and/or of the other geographically oriented units be adapted to the movement behavior of the subscribers.

Figure 2:
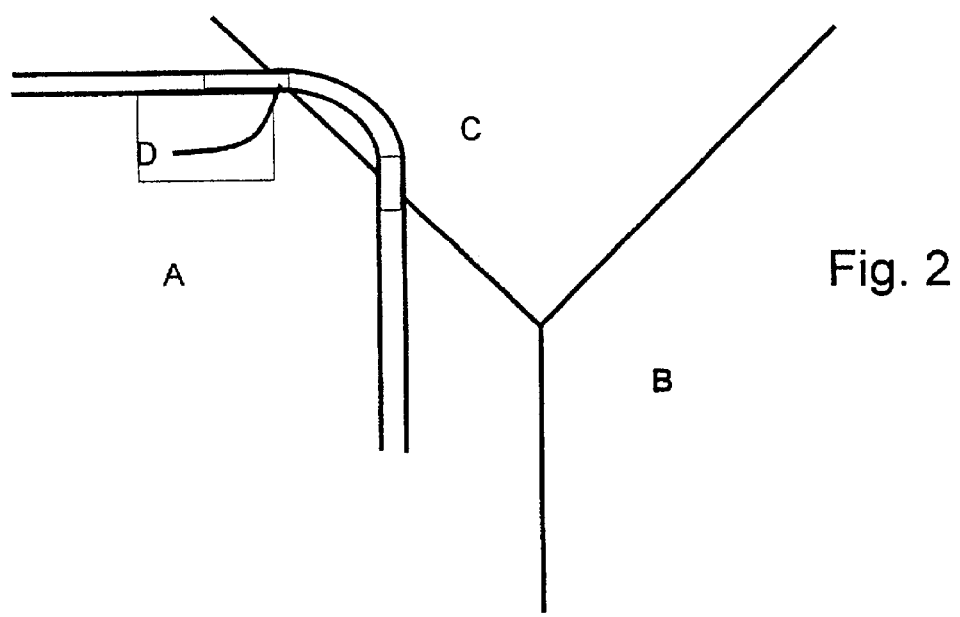
FIG. 2 shows a non-optimized boundary profile between geographically oriented units of the radio communication system.

FIG. 2 shows an example of a network topology which is not optimally adapted. The figure shows a section of a radio communication network in which three geographic units of identical hierarchical level A, C, B adjoin one another. A traffic artery D, for example a freeway, comes from the geographic unit A and runs over a short length within the unit C and then returns to the unit A. To simplify the description, it may be assumed that the geographic units A, C, B are MSC regions, but the problems are the same with location areas or BSC regions. It is assumed that the subscribers in each of the three regions A, B, C exhibit the same mobility behavior. Moreover, it may be assumed for the sake of simplicity that the number of subscribers in each of the three regions is approximately the same. An analysis of the degree of capacity utilization of the MSCs of the regions A, B, C may indicate that the resources of the MSC B are used up by 60%, whereas those of the MSCs A and C are used up by 80%. At present, all the MSCs can still handle the communication traffic without difficulty. However, it must be assumed that the number of the subscribers will grow in future, and, in all probability, will do so for all three regions considered at approximately the same rate. Given the present nature of the regions A, B, C, the MSCs A, B will therefore reach their limit of capacity more quickly than the MSC B, and so investment for extending the capacity in the regions A, C will become necessary soon, whereas resources will continue to lie fallow or unused in the region B. It is therefore desirable to distribute the processing load as uniformly as possible over all three regions.

Since it has been assumed that the number of subscribers and the traffic model are the same in the various MSC regions, the reasons for the different resource capacity utilization can be found only in a different processing load because of the mobility management in the various MSC regions. In the example considered here, these differences could be ascribed to users who use their mobile telephone when driving on the freeway D, or keep it on standby, and who thus give rise to a number of cell changes to be managed which is relatively high with reference to the number of subscribers in the regions A, C.

Figure 3:
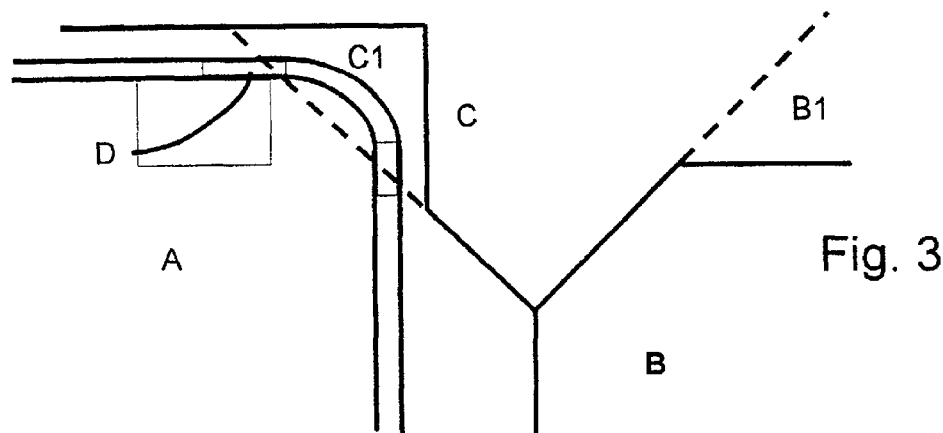
FIG. 3 shows an optimized boundary profile between the units.

In order to reduce this processing load, it would be possible, for example, to separate the part C1 from the region C and add it to the region A, as shown in FIG. 3, such that the freeway lies completely within the region A. However, this would lead to an increase in the number of subscribers in the region A at the expense of region C, and would in this way lead, in turn, to unequal distribution of the load. In the simple example considered here of only three regions, the problem can be solved graphically by a ring exchange in which a subregion B1 is separated from the region B and added to the region C, and a subregion A1 is separated from the region A and added to the region B such that the number of subscribers in all regions once again remains approximately equal. The larger the number of the regions to be considered in a network, the more difficult it is, however, to find such solutions. Moreover, the intuitive finding of a solution mostly presupposes knowledge of the reasons for an unequal distribution of the load.

The following approach to the method is therefore proposed according to the invention:

first, a plurality of functions specifying the processing load which is caused by the relevant base station at the assigned MSC are determined for each base station of the radio communication system or of a subregion to be optimized of the radio communication system.

A first contribution to the processing load of an MSC k comes from the call processing of the calls originating from the base station. This load can be different for each base station, and may be given by a function $a_{k,i}(x)$, i identifying the base station, k the MSC, and x specifying the number of subscribers. The function, a, can be set up as a function of the number of subscribers of the cell under consideration, but it is simpler for the following consideration when it is formulated as a function of the total number of the subscribers of the radio communication system. It is assumed that the number of the subscribers in a cell can be obtained by multiplying the total number of subscribers by a proportionality factor, the proportionality factor remaining substantially unchanged even when the number of the subscribers of the radio communication system grows in the course of time.

Assuming that S is the total number of subscribers of the radio communication system at the present instant, and that g specifies a rate of growth of the number of subscribers in the course of time, the total load which occurs at a future instant at an arbitrary mobile radio switching center MSC k can be estimated by the expression $$\sum_{i=1}^{N} a_{k,i}(S(1+g))x_{k,i}$$

the summation index i running over all base stations of the radio communication system, and the factor $x_{k,i}=1$ when the base station i under consideration belongs to the MSC region k, and is otherwise 0.

In an analogous way, functions $A_{k,l,i,j}$ can be set up which in each case specify the load which occurs at the MSC of the base station i because of handover and location updates upon the change of a subscriber from the cell of the base station i into the cell of a base station j when these base stations belong to different MSC regions k, l. The total load caused within the MSC region k by subscriber change into other MSC regions l can then be written as $$\sum_{\substack{l=1 \\ l \neq k}}^{M} \sum_{i=1}^{N} \sum_{j \in N(i)} A_{k,l,i,j}(S(1+g))X_{k,l,i,j}$$

where $X_{k,l,i,j}=1$ when the base station i is located in the MSC region k and the base station j in the MSC region l, and otherwise being 0. Since a handover or location update is possible only between such base stations which serve geographically adjacent cells, the summation over the base stations j can be limited to those base stations which belong to the set N (i) of the base stations adjacent to the base station i. M denotes the number of MSC regions.

Further functions $B_{m,n,i,j}$ are set up for the load which is caused at the MSC k by location updates and handovers between location areas within the MSC region k. The total load because of operations of this type at the MSC k may be written as $$\sum_{\substack{m \in M(k) \\ m < n}} \sum_{n \in M(k)} \sum_{i=1}^{N} \sum_{j \in N(i)} B_{m,n,i,j}(pg)Y_{m,n,i,j}$$

where $Y_{m,n,i,j}=1$, when the base station i is located in the location area m and the base station j is located in the location area n, and is otherwise 0. Here, as well, the summation can be limited to those base stations j∈N (i) which are adjacent to the base station i, and summation is carried out only over those location areas m, n which belong to the set M(k) of the location areas of the MSC k, it being prohibited for the location areas m, n to be the same.

A fourth contribution to the processing load is made by handovers and location updates which take place between BSC regions within individual location areas. Their contribution may be written as $$\sum_{m \in M(k)} \sum_{o \in L(k)} \sum_{\substack{p \in L(m) \\ o<p}} \sum_{i=1}^{N} \sum_{j \in N(i)} C_{o,p,i,j}(S(1+g))Z_{o,p,i,j}$$

$C_{o,p,i,j}$ being a function which specifies the contribution of the handovers from the base station i to the base station j on the assumption that i and j belong to different BSC regions o, p of the same location area, and $Z_{o,p,i,j}=1$ when the base station i is situated in the BSC region o and the base station j is situated in the BSC region p, and is otherwise 0. Once again, the summation extends over all base stations i= . . . , N, over the base station j∈N (i) which are adjacent to the base station i, over all location areas m∈M (k) which are situated in the MSC region k, and over all combinations of different BSC regions o, p from the location area m.

In order for the radio communication system to be functional, for all of the MSCs, the sum of the four load types must be smaller than the total processing capacity $L_k$ of the MSC k:

$$\sum_{i=1}^{N} a_{k,i}(S(1+g))x_{k,i} + \sum_{\substack{l=1 \\ l \neq k}}^{M} \sum_{i=1}^{N} \sum_{j \in N(i)} A_{k,l,i,j}(S(1+g))X_{k,l,i,j} + \quad (1)$$

$$\sum_{m \in M(k)} \sum_{\substack{n \in M(k) \\ m<n}} \sum_{i=1}^{N} \sum_{j \in N(i)} B_{m,n,i,j}(S(1+g))Y_{m,n,i,j} +$$

$$\sum_{m \in M(k)} \sum_{o \in L(k)} \sum_{\substack{p \in L(m) \\ o<p}} \sum_{i=1}^{N} \sum_{j \in N(i)} C_{o,p,i,j}(S(1+g))Z_{o,p,i,j} \leq L_k$$

$$\forall k \in \{1, \ldots, M\}$$

The network topology or, more accurately, the assignment of the various geographically oriented units of the radio communication system to the geographically oriented units of the next higher hierarchical level can be described with the aid of the symbols $$x_{k,i} = \begin{cases} 1 & \text{when } BTSi \text{ is situated in the } MSC \text{ region } k \\ 0 & \text{otherwise} \end{cases}$$

$$y_{m,i} = \begin{cases} 1 & \text{when } BTSi \text{ is situated in the location area } m \\ 0 & \text{otherwise} \end{cases}$$

$$z_{o,i} = \begin{cases} 1 & \text{when } BTSi \text{ is situated in the } BSC \text{ region } o \\ 0 & \text{otherwise} \end{cases}$$

For these symbols the boundary conditions apply:

$$\sum_{k=1}^{M} x_{k,i} = 1 \quad (2)$$

$$\sum_{m=1}^{} y_{m,i} = x_{k,i} \quad (3)$$

$$\sum_{o \in L(m)} z_{o,i} = y_{m,i} \quad (4)$$

$$\forall i \in \{1, \ldots, N\}, \forall k \in \{1, \ldots M\}, \forall l \in \{1, \ldots, L\}$$

These formulas correspond to the statement that each base station BTS i belong more accurately to an MSC region, that it is situated in a location area which belongs to the same MSC region as the base station itself, and/or that it is situated in a BSC region which belongs to the same location area as the base station itself.

The symbols X, Y, Z can be derived from the symbols x, y, z in each case by a pair of inequalities:

$$X_{k,l,i,j} \leq \min(x_{k,i}, x_{l,j}) \quad (5)$$

$$X_{k,l,i,j} \geq x_{k,i} + x_{l,j} - 1 \quad (6)$$

$$Y_{m,n,i,j} \leq \min(y_{m,i}, y_{n,j}) \quad (7)$$

$$Y_{m,n,i,j} \geq y_{m,i} + y_{n,j} - 1 \quad (8)$$

$$Z_{o,p,i,j} \leq \min(z_{o,i}, z_{p,j}) \quad (9)$$

$$Z_{o,p,i,j} \geq z_{o,i} + z_{p,j} - 1 \quad (10)$$

$$g \leq 0 \quad (11)$$

$$\forall k, l \in \{1, \ldots, M\}, k \neq l, \forall m, n \in \{1, \ldots, L\}, m \neq n,$$

$$\forall o, p \in \{1, \ldots, B\}, o \neq p, \forall i \in \{1, \ldots, N\}, \forall j \in N(i)$$

An optimized distribution of the base stations over the BSC regions, location areas and MSC regions of the radio communication system can now be determined by applying a linear optimization method to the system of equations and system of inequalities comprising the formulas 1–11. Program systems for this purpose are commercially available and therefore need not be explained more precisely here. The programs lp_solve or Siplex may be mentioned here merely as examples.

In this model, each base station is assigned to a BSC region, a location area and an MSC region, but there is no prescription as to the BSCs with which the base stations are connected. The left-hand side of equation 1 specifies the required resources at the MSC k at the instant t1 when the total number of subscribers has grown from p to pg. The boundary condition (11) ensures that in the optimization either a solution which permits a positive growth in the number of subscribers, or no solution is found.

It was assumed in the case of the above approach that a fixed assignment of the location areas to the MSC regions, and of the BSC regions to the location areas is given. This assumption can be weakened in the following way:

Once again, assignment of the location areas to the MSC regions is prescribed, but instead of permanently prescribing each location area the BSC regions contained therein, the following two sets are defined:

H(m)=set of all the BSC regions which can be situated in the location area m, and G(o)=set of all location areas which can contain the BSC region o, and it is required that both sets not be empty. The number of location areas and BSC regions is permanently prescribed as in the case of the previously described model. Instead of the symbols $Z_{o,p,i,j}$ from equation 1, a new symbol $W_{m,o,p,i,j}$ is introduced which is equal to 1 when the base station i belongs to the BSC region o, the base station j belongs to the BSC region p and the BSC regions k and l belong to the location area m, and is otherwise 0. The following relationships are set up using these symbols $$10,000(2 - z_{o,i} - z_{o,j}) \geq \left| \sum_{m \in G(o)} l(y_{m,i} - y_{m,j}) \right| \quad (12)$$

$$\sum_{o=1}^{B} z_{o,j} = 1 \quad (13)$$

$$\sum_{o \in H(m)} z_{o,i} \geq y_{m,i} \quad (14)$$

$$W_{m,o,p,i,j} \leq \min(z_{o,i}, z_{p,j}, y_{m,j}, y_{m,i}) \quad (15)$$

$$W_{m,o,p,i,j} \geq z_{o,i} + z_{p,j} + y_{m,j} + y_{m,i} - 3 \quad (16)$$

$\forall m \in \{1, \ldots, L\}, \forall o, p \in \{1, \ldots, B\}, o \neq p, \forall i \in \{1, \ldots, N\}, \forall j \in N(i)$.

The formulas 12 to 14 take the place of the formula (4), and the formulas (15) and (16) take the place of (9) and (10), respectively. The formula (1) is replaced by $$\sum_{i=1}^{N} a_{k,i}(S(1+g))x_{k,i} + \sum_{\substack{l=1 \\ l \neq k}}^{M} \sum_{i=1}^{N} \sum_{j \in N(i)} A_{k,l,i,j}(S(1+g))X_{k,l,i,j} + \quad (17)$$

$$\sum_{m \in M(k)} \sum_{\substack{n \in M(k) \\ n<m}} \sum_{i=1}^{N} \sum_{j \in N(i)} B_{m,n,i,j}(S(1+g))Y_{m,n,i,j} +$$

$$\sum_{n \in M(k)} \sum_{o \in H(m)} \sum_{\substack{p \in H(m) \\ o<p}} \sum_{i=1}^{N} \sum_{j \in N(i)} C_{o,p,i,j}(S(1+g))W_{m,o,p,i,j} \leq L_k$$

$\forall k \in \{1, \ldots, M\}$

The equations (13), (14) ensure that when the base station i belongs to the location area m it belongs to precisely one BSC region o from the set H(m). It holds for this location area m that $$m \in G(o) \text{ and } y_{m,i}=1 \quad (18)$$

Because of the large factor 10,000 the formula (12) does not constitute a limitation when $z_{o,i}$ and $z_{o,j}$ are not both equal to 1, that is to say when the base stations i, j do not both belong to the BSC region o. Otherwise, formulas 12 and 18 ensure that the base stations i, j belong to the same location area. In equation (17), summing is carried out over o, p∈H (m) instead of over o, p∈L(m) because $W_{m,o,p,i,j}$ is equal to 0, when o and p do not both belong to m.

As mentioned further above, the fixing of location areas leads to an enlargement of the load at the MSC. Consequently, in the case of an optimization when a complete reordering of all the BSC regions to location areas would be allowed, that is to say when the set H(m) were to contain all BSC regions of the radio communication system and the set G(o) were to contain all location areas, the optimization would lead to all the base stations of an MSC region being allocated to a single location area in order thus to minimize the load which is produced by the change of subscribers between location areas within an MSC region. Such a result is, however, undesired since, as already explained, it must lead to overloading of the broadcast channel. It may be excluded by defining, as an additional boundary condition for the optimization, a minimum ratio 0<q<1 of base stations per MSC region which must be assigned to each location area, that is to say $$\sum_{i=1}^{N} y_{m,i} \geq q \sum_{i=1}^{N} x_{k,i} \forall k \in \{1, \ldots, M\}, \forall m \in M(k), \quad (19)$$

and also taking this boundary condition into account during the linear optimization.

Another possibility of generalizing the model is to take into account limitations in capacity for the BSCs or the MSCs. If it is assumed, for example, that there is a limit C for the overall traffic which can be managed by a BSC, and that $T_i$ is the average traffic generated at the base station i, the following boundary condition can be added to the model $$\sum_{i=1}^{N} z_{o,i} T_i \leq C \quad (20)$$

which holds for each BSC region o. In a similar way, it would be possible to introduce an upper limit for the size and/or number of subscribers of the location areas, in order to limit the load on the broadcast channel. Other further practical requirements placed on a network design can easily be integrated into the model.

For large numbers of base stations, it is not possible to find an exact solution of the model even by assuming, in order to simplify, that the functions $a_{k,i}(x)$, $A_{k,l,i,j}(x)$, $B_{m,n,i,j}(x)$ and $C_{o,p,i,j}(x)$, are linear functions of x.

In practice, however, the model is frequently not required to be applied in its entire extent and to the entire network. Consequently, various simplifications are possible. It is possible, for example, to limit the approach to taking account only of those ones of the various handovers and/or location update processes which cause the highest processing outlay, generally those which take place between two different MSC regions. This is equivalent to setting the functions $B_{m,n,i,j}$, $C_{o,p,i,j}=0$ in formula (1); the optimization task is then simplified to a problem of selecting the variables $X_{k,i}$ such that the formula $$\sum_{i=1}^{N} a_{k,i}(S(1+g))x_{k,i} + \sum_{\substack{l=1 \\ l \neq k}}^{M} \sum_{i=1}^{N} \sum_{j \in N(i)} A_{k,l,i,j}(S(1+g))X_{k,l,i,j} \leq L_k \quad (21)$$

$$\forall k \in \{1, \ldots, M\}$$
$$g \geq 0$$

is fulfilled together with the above formulas (2), (5), (6) and that g reaches a maximum. When the functions $a_{k,i}(x)$ and $A_{k,l,i,j}(x)$ can be approximated by linear functions in the form of $a_{k,i}(S(1+g))=(1+g) a_{k,i}(S)$, the formula 21 can also be written as $$(1+h)\left(\sum_{i=1}^{N} a_i(p)x_{k,i} + \sum_{\substack{l=1 \\ l \neq k}}^{M} \sum_{i=1}^{N} \sum_{j \in N(i)} A_{i,j}(p)X_{k,l,i,j}\right) \leq hL_k \quad (21')$$

$$\forall k \in \{1, \ldots, M\}$$
$$0 < h < \leq \infty$$

where h=1/g. The optimization task is then to select the $x_{k,i}$ such that h can be selected as small as possible.

Figure 4:
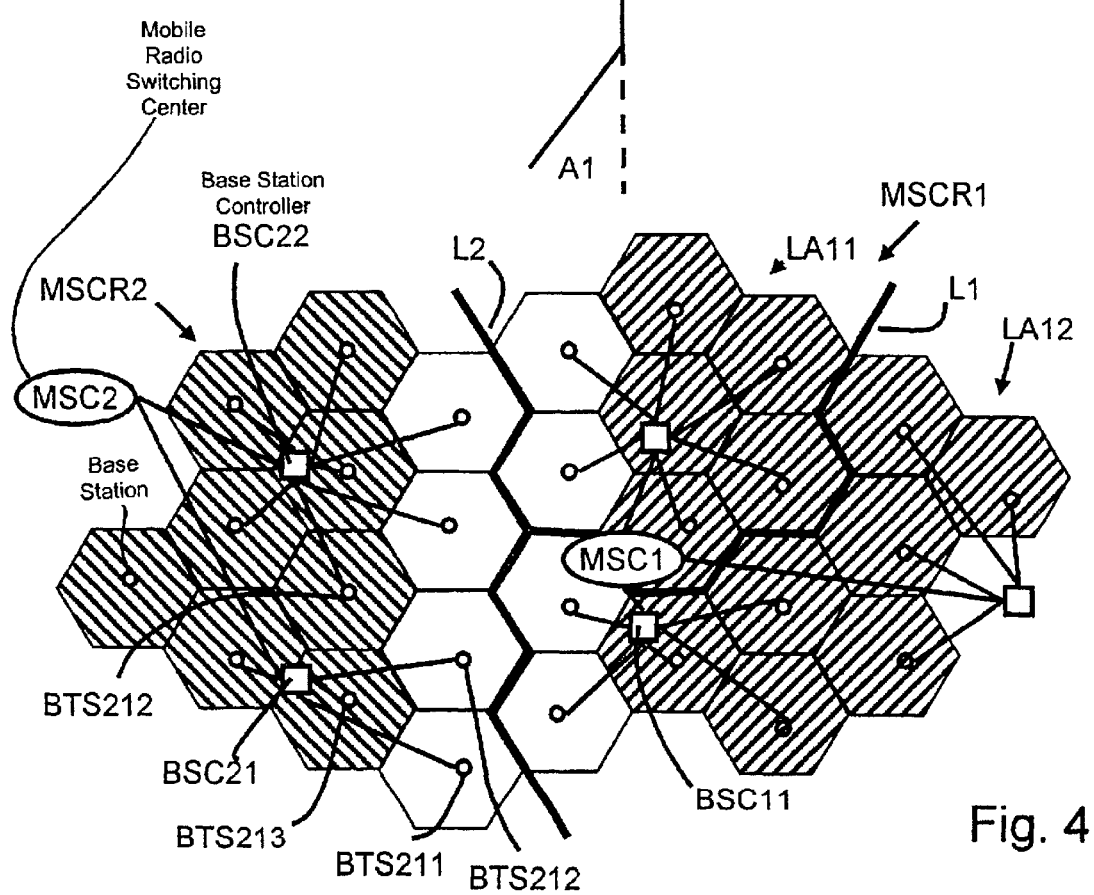
FIGS. 4 and 5 illustrate the iterative execution of the method.

In general, a network planner will not attempt to redesign the entire structure of the network from scratch, but he will only optimize the regions at the boundaries of the MSC regions. FIG. 4 illustrates this with the aid of the same network section which has already been illustrated in FIG. 1. Those cells of the MSC regions MSCR1 and MSCR2 which are not adjacent to the respective other region are emphasized by hatching. The assignment of these cells to their MSC regions is not to be called into question in the optimization; the contributions of these cells to the processing load can therefore be summarized in the optimization to the constant term σ and the summation is performed not over all base stations i=1, . . . N, but only over those base stations i which are situated at the boundary of the MSC regions.

$$(1+h)\left(\sum_{i=1}^{N} a_{k,i}(p)x_{k,i} + \sum_{\substack{l=1 \\ l \neq k}}^{M} \sum_{i} \sum_{j \in N(i)} A_{k,l,i,j}(p)X_{k,l,i,j}\right) \leq h(L_k - \sigma) \quad (22)$$

$$\forall k \in \{1, \ldots, M\}$$
$$0 < h < \infty$$

Figure 5:
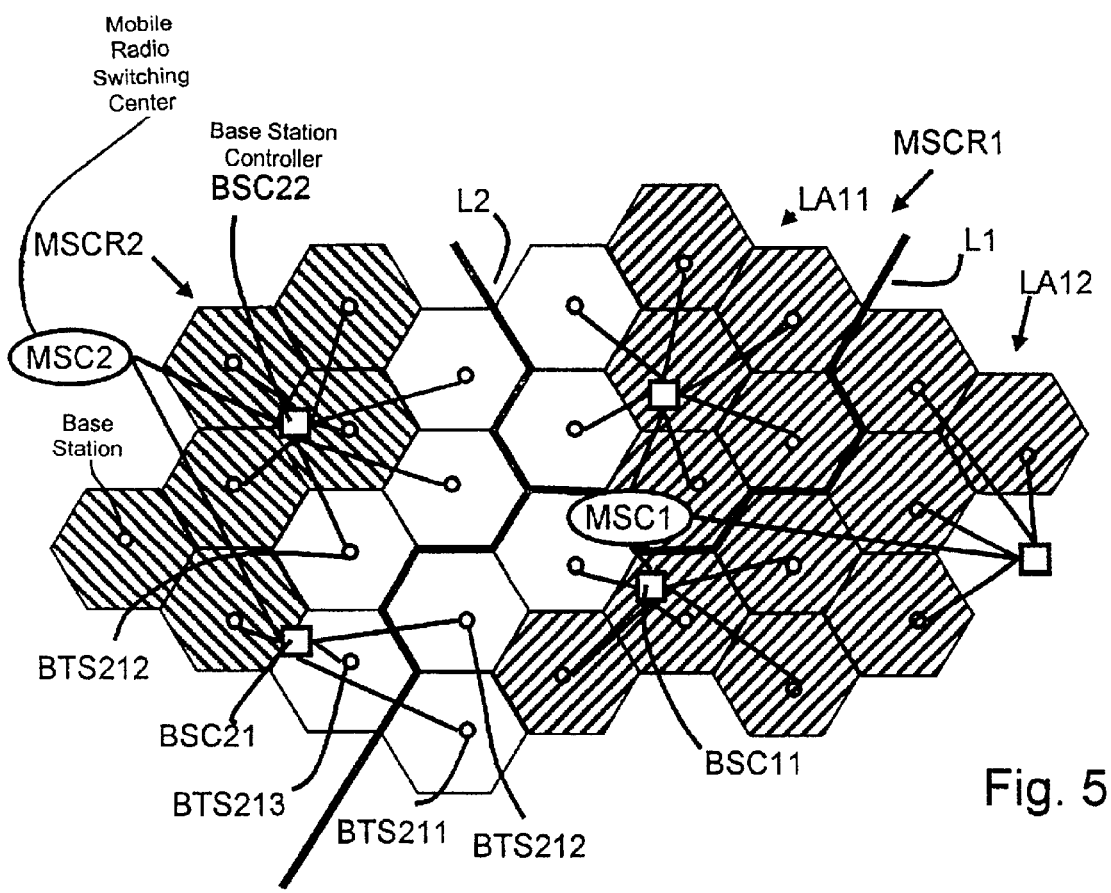

A possible result of this optimization is illustrated in FIG. 5: two base stations BTS211, BTS212, which were still assigned to the BSC21 in FIG. 4, have been added to the BSC11. Consequently, the position of the boundary line L2 between the two MSC regions is displaced, and the set of the base stations to be taken into account in a second optimization step is changed.

When the optimization for the new boundary line L2' is repeated, it is then also possible to bring into question the assignment of base stations to the MSC region MSCR2 which were not yet situated at the boundary in the state shown in FIG. 4, such as the base stations BTS213, BTS221, for example. It is therefore possible by multiple repetition of an optimization limited to the boundary region also to optimize deep reaching changes in the network structure with a low outlay in computation.

The above description took account only of the optimization of the assignment of base stations or of the cells supplied by them to geographically oriented units of a higher hierarchical level of the network. However, it is evident that a corresponding optimization can also be carried out for the assignment of BSC regions to location areas or MSC regions when load functions such as the functions $a_i$, $A_{i,j}$ etc. are formulated for entire MSC regions instead of for the base stations, and these functions are used to set up a formula which permits calculation of the resulting load at the MSCs for given assignments of BSCs to location areas and MSCs.

I claim:

1. A method for assigning geographically oriented units of a first hierarchical level of a radio communication system to geographically oriented units of at least one second hierarchical level that is higher than the first hierarchical level, which comprises:

setting up functions that specify, as a function of a number of subscribers of a radio communication system, a size of a load, that is selected from the group consisting of a radio load and a switching load, and that is caused by a geographically oriented unit of a first hierarchical level at a node of the radio communication system;

setting up a formula which, using the functions, permits a size of a processing load occurring at each node, in a case of a given assignment of geographically oriented units of the first hierarchical level to geographically oriented units of the second hierarchical level, to be calculated for a given number of the subscribers; and using the formula to select an assignment that permits a greatest possible growth in a number of subscribers of the radio communication system without a processing load at a geographically oriented unit of the second hierarchical level exceeding resources of the geographically oriented unit of the second hierarchical level.

2. The method according to claim 1, which comprises using a method of linear optimization to select the assignment.

3. The method according to claim 1, wherein:

the geographically oriented units of the first hierarchical level are units selected from the group consisting of cells of the radio communication system and base stations of the radio communication system; and the geographically oriented units of the second hierarchical level are units selected from the group consisting of mobile switching center regions, location areas, and base station controller regions.

4. The method according to claim 1, which comprises approximating the functions using linear functions of the number of subscribers.

5. The method according to claim 1, which comprises:

using an existing assignment of the geographically oriented units of the first hierarchical structure of the radio communication system to the geographically oriented units of the second hierarchical structure as a starting point; and considering only geographically oriented units of the first hierarchical structure which are situated at a boundary between two geographically oriented units of the second hierarchical structure.

6. The method according to claim 5, which comprises using iteration.

* * * * *